July 31, 1945. C. J. DIPPEL ET AL 2,380,585
COPYFILMS FOR LENTICULAR SOUND TRACKS
Filed April 10, 1941 3 Sheets-Sheet 1
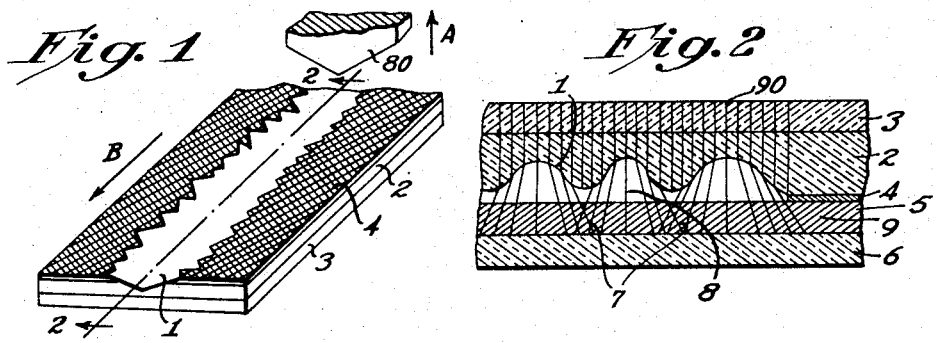
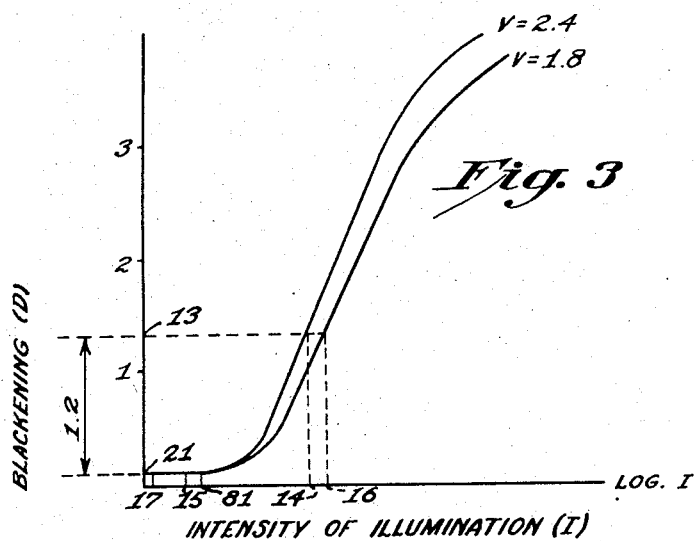
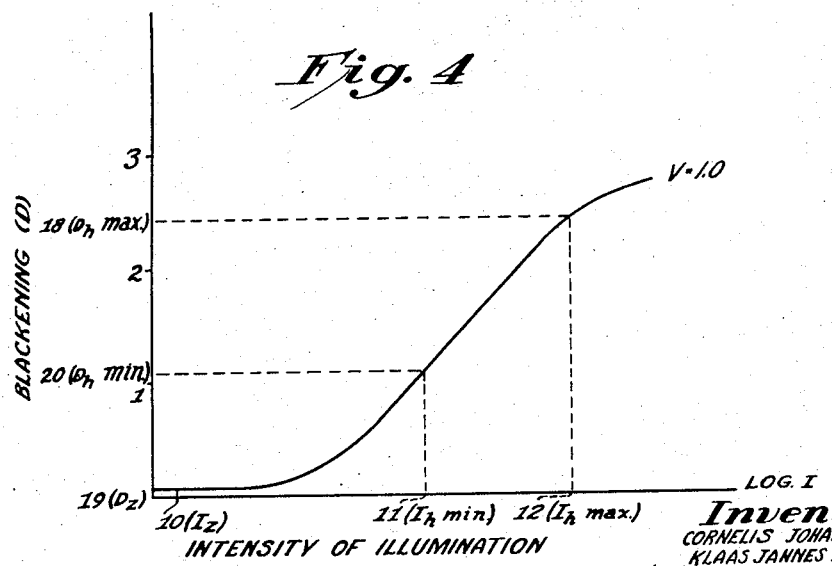
Inventors
CORNELIS JOHANNES DIPPEL,
KLAAS JANNES KEUNING,
HONORÉ JOSEPH JULES VERKINDEREN &
RENÉ LAURENT HENRI VAN HOESTENBERGHE
By *Attorney.*

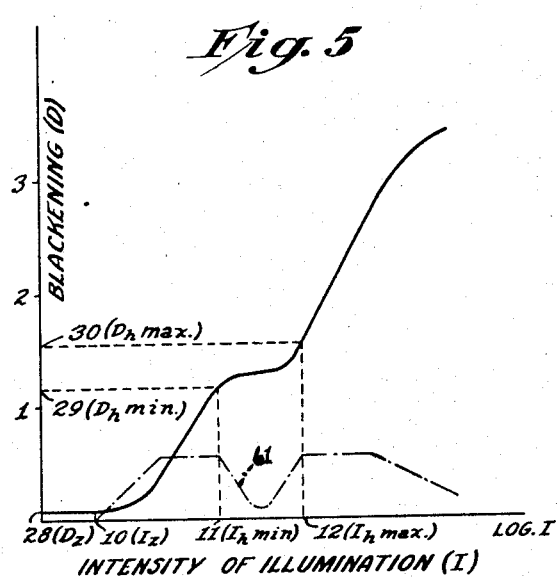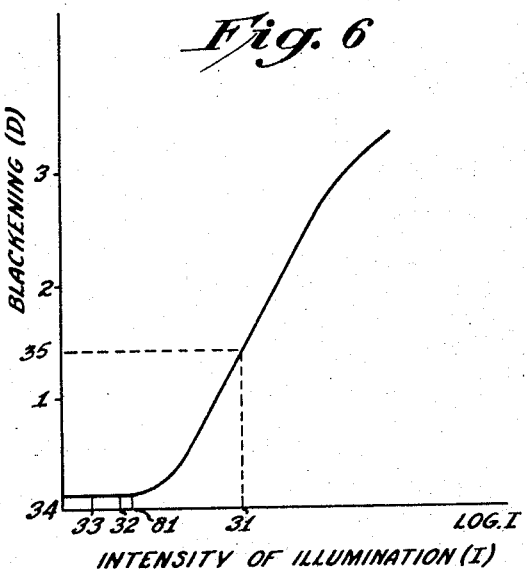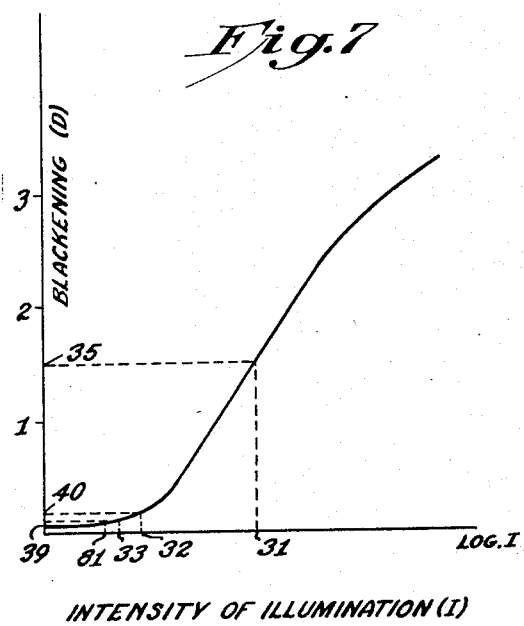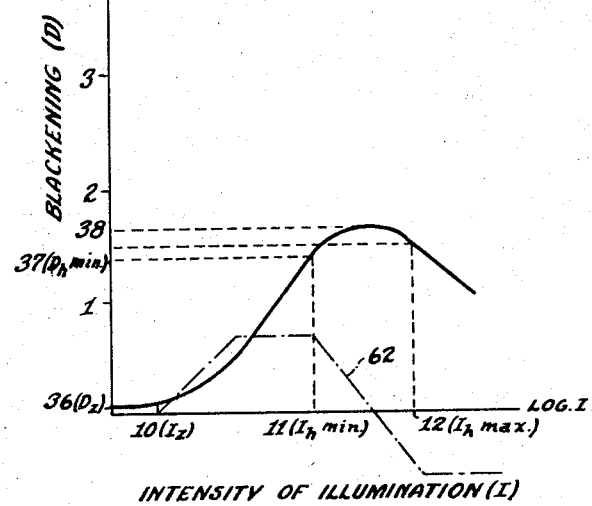

July 31, 1945.　　　C. J. DIPPEL ET AL　　　2,380,585
COPYFILMS FOR LENTICULAR SOUND TRACKS
Filed April 10, 1941　　　3 Sheets-Sheet 3
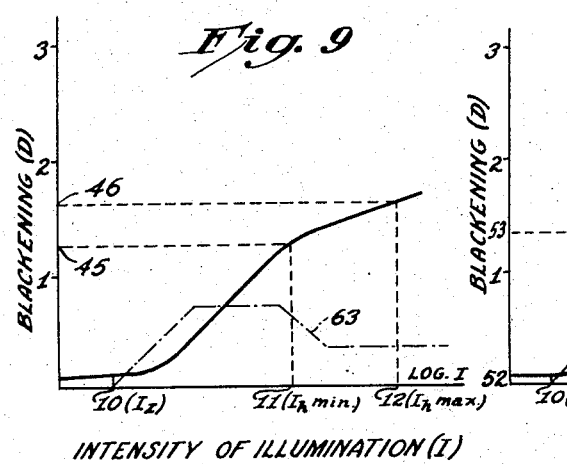
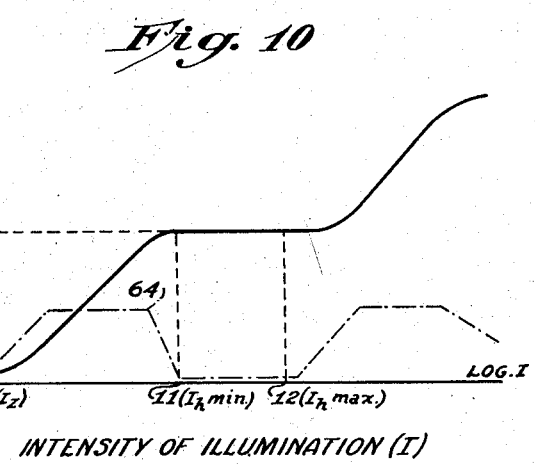
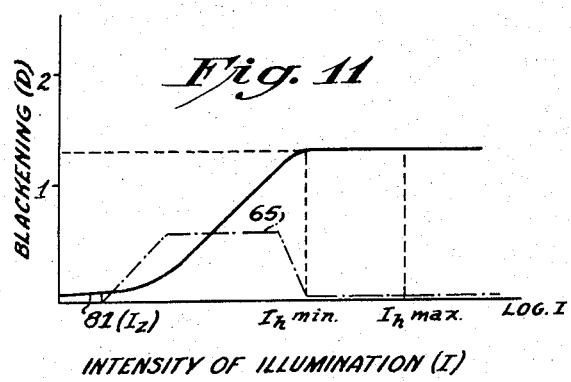
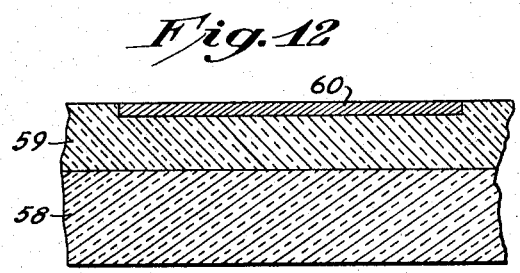
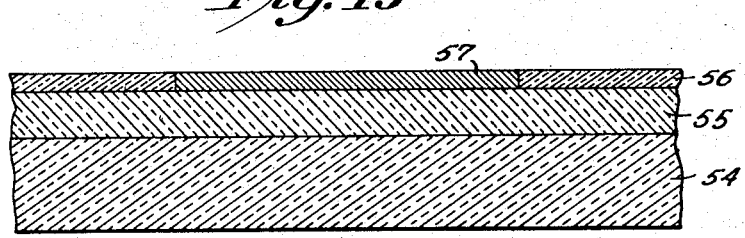
Inventors
CORNELIS JOHANNES DIPPEL
KLAAS JANNES KEUNING
HONORÉ JOSEPH JULES VERKINDEREN &
RENÉ LAURENT HENRI VAN HOESTENBERGHE
By　*Attorney.*

Patented July 31, 1945

2,380,585

UNITED STATES PATENT OFFICE 2,380,585

COPY FILM FOR LENTICULAR SOUND TRACKS

Cornelis Johannes Dippel and Klaas Jannes Keuning, Eindhoven, Netherlands, and Honoré Joseph Jules Verkinderen, Mortsel, and René Laurent Henri Van Hoestenberghe, Berchem, Belgium; vested in the Alien Property Custodian Application April 10, 1941, Serial No. 387,974
In the Netherlands June 21, 1938

6 Claims. (Cl. 95—5)

Our invention relates to films for copying lenticular sound tracks.

Our invention is particularly concerned with films for copying sound records having an optically reproducible sound track with depth variations and in most cases width variations as described in our copending application Serial No. 280,188, filed June 20, 1939, and of which the present application is a continuation-in-part. Such a sound track has a wavy surface which is not parallel to the surface of the carrier, and when it is copied, for instance by transmitted light, the light rays will be partly refracted at the surface of the track. Consequently the luminous intensity of the light striking the copy film is determined not only by the bright and black portions of the sound track, but also by the amount of the refraction. This refractive phenomenon will hereinafter be referred to as a "lens effect" and a sound track which has this property will be referred to as a "lenticular" track.

We have found that when such sound tracks are photographically copied twice, there is the difficulty that dark striae are produced in the non-blackened portions of the copies and cause distortion of the sound during reproduction. This difficulty is particularly prevalent in copying a sound record comprising a transparent sound track having both width and depth variations and "opaque" surroundings, such as are produced with a cutting tool having a V-shaped cutting edge in the manner described in the U. S. Patent #1,919,116 to James A. Miller. The term "opaque" portion as used herein and in the claims is to be understood to mean a portion whose transparency to the type of light used for copying or scanning is very small in comparison with that of the transparent parts.

For a complete understanding of the problems in copying such sound records it should be noted that if a positive copy, to be referred to as a "positive," made from such a sound record is to be suitable for reproduction with photo-electric cells it must satisfy two main requirements. First, the blackening difference between the "opaque" and the transparent portions of the positive must have a minimum value of 1.2 in order to produce a sufficient difference in luminous intensity on the cathode of the photo-electric cell. Secondly, no dark striae or blurred transitions should be present on the transparent portions of the positive. To obtain such a positive, the negative used in the copying should either have no variations in the "opaque" portion or should have variations which, upon printing, fall below the threshold value of the blackening curve of the positive. It should also be noted that, with the copying methods, positive material and developing methods used at the present time, it is necessary to have a minimum blackening difference of about 1.0 between the sound track and its surrounding on the negative in order to obtain the desired blackening difference of 1.2 between the bright and dark parts of the sound track on the positive. With present-day copying methods, a maximum gamma of 2.4 is seldom exceeded in copying in view of the picture films to be developed by means of the same copying device, and with such a gamma value it is just possible to obtain the above-mentioned blackening difference of 1.2 on the positive, with the minimum blackening differences of about 1.0 on the negative.

By using a positive film, for instance with a smaller foot of the blackening curve than is used at present or by being allowed to raise the admissible gamma, the required blackening difference on the positive can be obtained with a blackening difference of less than 1.0 on the negative, but in this case it would probably not be possible to go lower than 0.8.

If the condition imposed on the minimum blackening difference of the negative is not satisfied and from this negative is printed a positive having a blackening difference of 1.2 between track and its surroundings, opaque striations will arise in the bright sound track of the positive which, as stated, have a deleterious effect on the reproduction.

If it is desired to obtain a positive without striae in the track, one might make the negative so that the minimum blackening caused by the lens effect of the original track amounts to more than 1, for instance to 1.4. However, this has the drawback that the stronger blackening so occurring due to the lens effect, is accompanied by an effective reduction of the amplitudes, more particularly of the high frequencies due to diffusion.

Above we have stated the factors which have to be considered when a positive copy is made from an initially-positive sound track. However, analogous factors apply in copying a negative sound track involving lens effect in its transparent surroundings.

The main object of the present invention is to provide a copyfilm with which the above mentioned drawbacks due to lens effect can be eliminated.

According to the invention the copy film has a light sensitive emulsion layer having a blackening curve the derivative of which has either a minimum or exhibits a decrease with increasing exposure at a blackening of 0.5–1.8 and a derivative below 0.6 in the region of the usual blackening.

If the derivative of the blackening curve either has a minimum or exhibits a decrease with increasing exposure this signifies in both cases that the derivative in this region of 0.5–1.8 has a value which is smaller than that in the immediate adjoining region having a smaller exposure. In other words the derivate is locally smaller than in the immediately adjoining part of the blackening curve towards the side of smaller exposure. Consequently the blackening variations produced on such a film by the lens effect will be smaller than when using a copying film having a normal blackening curve and as a result the maximum blackening may also become smaller. Since the blackening variations on this copy are smaller, the variations in luminous intensity of any print made from this copy are also smaller so that the blackening variations on the print may remain below the threshold value of the blackening curve even with a sufficient intensity of the copying light and are no longer perceptible in the sound track eventually obtained.

The term "minimum" as used herein and in the claims is to be understood to include the case in which the derivative falls to a definite minimum value and remains at this value over a portion of the blackening curve.

With the above-mentioned minimum difference of 0.8 between the minimum blackening due to lens effect and the transparent parts of the sound track on the negative, it is possible to print this negative sound track on a positive film and obtain the required blackening difference between the sound track and its surroundings.

In copying mechanically-recorded sound tracks in accordance with the invention one may depart from the technique used in printing normal sound films, viz. that the record has always to take place in the straight part of the blackening curve and consequently in copying one may use films whose blackening curve is different from the normal one.

The expression "region of usual blackening" is to be understood to mean a region which extends between the minimum blackening which gives a good copy and the blackening at which the intensity due to the diffused light beyond the track becomes so high that the spaces between the peaks of the amplitudes of the track are also blackened to an undesirable degree. With present-day photographic films the minimum limit is about a blackening of about 1, and the maximum limit is a blackening of about 1.8.

In order that the invention can be clearly understood and readily carried into effect we shall described the same in more detail with reference to the accompanying drawings in which.

Figure 1 is a perspective view on an enlarged scale of a portion of a film carrier provided with a mechanically-recorded and optically-reproducible sound track and shows the cutting tool for producing the track, Fig. 2 is a sectional view on an enlarged scale of the carrier of Figure 1 placed on top of a sensitized copying film, Figs. 3 and 4 are blackening-illumination curves of the positive and negative films respectively upon which the sound track of Figure 1 is copied.

Figs. 5 to 11 inclusive are blackening-illumination curves for use in describing the method of the invention, and Figs. 12 and 13 are sectional views on enlarged scales of sensitized films according to the invention.

The film carrier shown in Fig. 1 comprises a supporting layer 3 of transparent material, such as Celluloid, a cutting layer 2 of transparent material, such as gelatin, and a thin covering layer 4 of opaque material, such as a colloidally-dispersed metal. A cutting tool 80 having a V-shaped cutting edge with a large apical angle is vibrated in accordance with the sound vibrations to be recorded in the direction of the double-headed arrow A while the film is moved at a constant speed in the direction of arrow B to thereby produce a sound track I having both width and depth variations. Such methods of recording have been described in detail in the above-mentioned Patent #1,919,116, and the track I is suitable for optical reproduction with the aid of a photo-electric cell. However, if the track is to be photographically printed, difficulties arise due to the lens effect, as will be set forth in more detail with reference to Figure 2.

As shown in Figure 2, the carrier of Fig. 1 is placed on top of a copying film comprising a transparent Celluloid layer 6 provided with a layer 5 of a sensitized emulsion. In printing track I, which has an undulated surface, the rays of the copying light, indicated by reference numeral 90, are refracted at the undulated surface of the track with the result that the layer 5 is unevenly illuminated i. e. spots 7 have a great luminous intensity and spots 8 have a small luminous intensity. Only a very small quantity of light impinges on the portion 9 of the emulsion 5 which is beneath the spots where the cutting tool has not penetrated into the "opaque" coating 4.

In the further discussion, the quantity of light impinging upon spots 7 of maximum illumination intensity will be denoted by $I_{h\ max.}$, the quantity of light impinging on spots 8 of minimum illumination intensity will be indicated by $I_{h\ min.}$, and the light passing through the "opaque" coating 4 will be denoted by $I_z$. Furthermore, the values $I_z$, $I_{h\ min.}$ and $I_{h\ max.}$ will also be designated by the reference numbers 10, 11 and 12 respectively. The blackenings brought about on the first copy by these illumination intensities will be denoted by $D_z$, $D_{h\ min.}$ and $D_{h\ max.}$ respectively.

From the above it appears that in printing the initial or original mechanically-recorded sound film on a negative film, a sound track having blackenings between $D_{h\ min.}$ and $D_{h\ max.}$ is obtained. Due to this, principally three illumination intensities will have to be considered in printing this negative film on a positive film. One would be inclined to cause the variations in illumination intensity brought about by the blackening variations produced by the lens effect in the original sound track, to fall below the threshold value of the blackening curve of the positive. However, from the following discussion it will be seen that there are drawbacks to such a procedure.

As has been mentioned above, a positive designed for photo electrical reproduction must satisfy two main conditions. One of these is that the minimum blackening of 1.2 determines, at a given value for the gamma, the required minimum blackening difference between the bright parts and those parts which are blackened least due to the lens effect on the negative ($D_z$ and $D_{h\ min}$).

Fig. 3 illustrates the blackening and ratios of illumination intensity for a normal positive film developed in Kodak developer $D_{16}$. A minimum blackening difference (13—21) of 1.2 is desirable. If this film is developed under the most favorable conditions to a gamma of 2.4, this would require an illumination indicated by reference numeral 14. To satisfy the second condition, namely that there be no black striae in the transparent parts of the copies, it is necessary that the illumination 15, which results from the light transmitted due to the minimum blackening $D_{h\ min}$. of the negative, falls below the threshold value 81 of the blackening curve of the positive. As appears from the figure the range of illumination lies partly in the foot of the blackening curve, and thus the difference between the logarithms of the illumination intensities indicated by reference numerals 14 and 15 must have a minimum value of 1.0.

In printing the positive and in developing the same, it must be taken into account that the usual copying plants in general, develop all whiteblack films, particularly in view of the conditions to be met by the picture image, to a gamma lying between 1.8 and 2.4 so that on producing sound films for commercial use, these limits of the gamma must be taken into account. If the development of the positive film goes only to a gamma of 1.8, then an illumination as indicated by 16 in Figure 3 is necessary to obtain the required blackening difference 13—21. From Figures 3 and 4 it appears that in such a case the difference between the logarithms of the corresponding illumination intensities 15 and 16 has a minimum value of 1.1. With these differences in illumination intensity, the illuminations 15 and 17 caused by the "lens effect" may be held below the threshold value 81 of the blackening curve of the positive film while at the same time conserving on the positive the minimum blackening difference of 1.2 required for satisfactory reproduction by a photo-electric cell.

The stated illumination value determines the conditions which must be satisfied by the blackening difference on the negative, from which the above-mentioned positive is to be printed. Thus, as shown in Fig. 4 the minimum blackening difference 20—19 i. e. $D_{h\ min}$.—$D_z$ in the sound track on the negative must be at least 1.0 and preferably greater than 1.1 in order to ensure in all cases good results on the positive. Considering these conditions, and a gamma of the negative determined by the conditions to be mentioned hereinafter, it is not difficult to determine the illumination 11 required therefor. The illumination of the negative, which is to be understood to be the difference between log $I_{h\ min}$. and log $I_z$, depends on the blackening of the "opaque layer" 4 of the original sound record, which for copying light may be assumed to be about 2.3. Consequently in developing the negative it must be taken into account that the logarithmic difference in illumination intensity 11—10 is determined by the blackening of the "opaque layer" 4, which in the example illustrated in the drawings amounts to 2.3. With this minimum difference in luminous intensity, $I_r$—$I_{h\ min}$. of 2.3, a blackening difference 20—19 of 1.0 must be attained. It appears that in the most unfavorable case the negative must, for this purpose, be developed to a gamma of 1.0.

However, it should be remembered that because of "lens effect," a maximum illumination intensity 12 up to twenty times as strong as illumination 11 already occurs. The blackening 18, which corresponds to this maximum illumination, may now have such a value that, due to interal diffusion, the resolving power becomes so small that it is impossible to obtain a sound reproduction of good quality from the positive printed from this negative.

Upon printing the original sound record on a copying film according to the invention having a blackening curve such as shown in Fig. 5, the above-mentioned difficulties can be obviated. In fact, the curve represented in Fig. 5 has a smaller gamma in the range of the usual blackening than in the immediately adjoining region of weaker blackening. The dot-and-dash line 61 represents the course of the gamma through the blackening region. In printing, the variations in luminous intensity between 11 and 12 ($I_{h\ min}$. and $I_{h\ max}$.) lie in that range so that the blackening 30 becomes materially smaller than in printing the film exhibiting the same intensity difference on a film having a normal blackening curve. However, as the maximum blackening 30 is smaller, the resolving power is higher with the result that a greater marginal definition is obtained. At the same time the blackening difference 30—29 ($D_{h\ max}$.—$D_{h\ min}$.) is smaller than that obtained in printing on a film having a normal curve; the blackening difference 29—28 ($D_{h\ min}$.—$D_z$) being nevertheless of the same order of magnitude. This makes it possible to produce a good second copy (positive) on a film having a normal curve, as is shown in Fig. 6.

As shown in Fig. 6, the variations 32—33, due to $D_{h\ min}$. and $D_{h\ max}$. of the negative may easily fall below the threshold value 81 of the blackening curve, while in spite of this the intensity difference 31—32 is sufficient to produce on this second copy a blackening 35 exceeding 1.2 relatively to the fog 34 in the track 1, 2.

If, for some reason, for instance because the gamma of the second copy cannot be sufficiently raised, the illumination must be raised to such a degree for obtaining a sufficient blackening 35 that the variations 32—33 fall partly above the threshold value 81, as shown in Fig. 7, then the blackenings 39—40 are weaker in the final sound track.

Films having a blackening curve such as shown in Fig. 8, in which the gamma as indicated by the dot-dash line 62 exhibits a decrease with increasing illumination intensity and acquires a negative value, yield the same advantages. As shown in this figure, an illumination 10 yields a blackening 36, whereas in the region of the variations in luminous intensity 11—12, there are blackenings between 37 and 38 on the negative. As the maximum blackening 38 is materially smaller than the maximum blackening on a normal film, we obtain the same advantages set forth above.

The blackening curve shown in Fig. 9 comprises at least two parts having different gammas, as appears from the dot-dash curve 63. In the region below the usual blackening, the gamma has a minimum value of about 1, and in the region of the usual blackening the value of the gamma falls below about 0.6 so that in this range the blackening remains small due to $I_{h\ max}$. As a result, the blackening variation 46—45 is small so that the above-mentioned advantages can also be obtained therewith.

Figs. 10 and 11 represent a blackening curve which is very favorable for this purpose and whose derivate represented by the dot-dash curves 64 and 65 respectively approach zero in the usual blackening region over a large illumination interval. If the region of intensity variations caused by the lens effect is located in this illumination interval, the first copy obtained will have a perfectly uniform blackening 53 in the sound track so that even in the first copy of the blackening variations due to the lens effect are entirely eliminated. By suitably positioning that part of the curve in the region of usual blackening which approaches to zero, the blackening difference 52—53 is, moreover, larger than 1.0.

The curves referred to above can practically be obtained in two different ways, viz. by

*I. Controlled development of normal photographic emulsions.*—By abruptly interrupting the development, the emulsion layer is developed only to a definite depth so that even if the light effect has penetrated to a greater depth, the emulsion layer will be blackened only to a definite depth. As a result there will be obtained a blackening curve such as shown in Fig. 11 which has a decidedly horizontal part above a definite blackening value. Such a film is shown in Fig. 12, in which the reference numeral 58 denotes a Celluloid supporting layer and a reference numeral 59 indicates an emulsion layer in which the sound image 60 is produced only to a certain depth. This controlled development may be obtained by adding to the developing bath a high percentage, about 10%, of alcohol, glycerin or acetone, or about 20% of sodium sulphate.

*II. By normal development of a film with two sensitized emulsions of a decidedly different character or by definite kinds of light.*—These different emulsions may be provided in two distinct layers. If the top layer is much more sensitive than the second layer, for instance the top layer is a panchromatic and the second layer is a non-panchromatic layer, or if the top layer is a silver bromide layer and the second layer is a paper-silver-chloride layer respectively, a blackening curve such as shown in Fig. 10 is eventually obtained, i. e. a curve comprising two separate parts connected by a substantially horizontal part. If the gammas of both emulsions are equal, both parts will have the same steepness. If the layers differ in gamma for a definite type of light then the curve shown in Fig. 9 is obtained. Both emulsions may also be mixed so as to form a single layer in which case the curves obtained are similar to those obtained in the case referred to above. In all cases, however, there should be a difference in sensitiveness between both emulsions.

In all cases referred to above an anti-halation layer may be provided for reducing diffusion.

As an alternative, a very thin emulsion layer of the order of magnitude of 5 microns or less may be provided on an anti-halation substratum. If the thickness and sensitiveness of the emulsion layer are judiciously chosen, the maximum blackening of this layer just lies in the range of usual blackening, namely between about 1 and 1.8. Thus, a blackening curve such as shown in Fig. 9 or Fig. 11 is obtained. Similar results may be secured by the use of a very thin emulsion layer on a substratum of a light sensitive emulsion layer containing a dye, in combination with a special printing light being readily absorbed in said dye. As such we can use a substratum containing tartrasine in combination with blue printing light. A film of this type is shown in Fig. 13 in which a Celluloid layer 54 carries an anti-halation layer 55 and a thin emulsion layer 56 in which a sound image 57 is produced.

Although we have described our invention with reference to specific examples and applications, we do not wish to be limited thereto because obvious modifications will readily present themselves to one skilled in this art.

What we claim is:

1. In the copying of a sound carrier having a lenticular sound track characterized by depth and width variations which refract light passed through the sound track and produce a copying light-beam of non-uniform intensity, the method of photographically producing a copy of said sound track precluding the formation of striae due to the non-uniform intensity of the copying light-beam, comprising the steps of passing light through the sound track, and exposing with the resulting light-beam of non-uniform intensity and developing, a copy film comprising a light-sensitive silver-halide emulsion layer so that said light-sensitive layer has a blackening curve characterized by a variable derivative at a blackening of 0.5 to 1.8 and a derivative of zero in the region of blackening of 1 to 1.8, the said exposure having a value at which the range of the light intensity variations produced by the refraction of light through the carrier falls within the region of zero derivative of the blackening curve and the formation of striae due to the non-uniform intensity of the copying light-beam is substantially precluded.

2. In the copying of a sound carrier having a lenticular sound track characterized by depth and width variations which refract light passed through the sound track and produce a copying light-beam of non-uniform intensity, the method of photographically producing a copy of said sound track precluding the formation of striae due to the non-uniform intensity of the copying light-beam, comprising the steps of passing light through the sound track, and exposing with the resulting light-beam of non-uniform intensity and developing, a copy film comprising a light-sensitive silver-halide layer having a thickness not exceeding 6 microns, so that said light-sensitive layer has a blackening curve characterized by a variable derivative at a blackening of 0.5 to 1.8 and a derivative of zero in the region of blackening of 1 to 1.8, the said exposure having a value at which the range of the light intensity variations produced by the refraction of light through the carrier falls within the region of zero derivative of the blackening curve and the formation of striae due to the non-uniform intensity of the copying light-beam is substantially precluded.

3. In the copying of a sound carrier having a lenticular sound track characterized by depth and width variations which refract light passed through the sound track and produce a copying light-beam of non-uniform intensity, the method of photographically producing a copy of said sound track precluding the formation of striae due to the non-uniform intensity of the copying light-beam, comprising the steps of passing light through the sound track, and exposing with the resulting light-beam of non-uniform intensity and developing, a copy film comprising a light-sensitive coating including a layer of a light-sensitive silver-halide emulsion and a covering layer of a light-sensitive silver-halide emulsion of different characteristics than the first emulsion, so that the coating has a blackening curve characterized by a variable derivative at a blackening of 0.5 to 1.8 and a derivative of zero in the region of blackening of 1 to 1.8, the said exposure having a value at which the range of the light intensity variations produced by the refraction of light through the carrier falls within the region of zero derivative of the blackening curve and the formation of striae due to the non-uniform intensity of the copying light-beam is precluded.

4. In the copying of a sound carrier having a lenticular sound track characterized by depth and width variations which refract light passed through the sound track and produce a copying light-beam of non-uniform intensity, the method of photographically producing a copy of said sound track precluding the formation of striae due to the non-uniform intensity of the copying light-beam, comprising the steps of passing light through the sound track, and exposing with the resulting light-beam of non-uniform intensity and developing, a copy film comprising an anti-halation substratum and a light-sensitive coating including a layer of a light-sensitive silver-halide emulsion and a covering layer of a light-sensitive silver-halide emulsion of different characteristics than the first emulsion, so that the coating has a blackening curve characterized by a variable derivative at a blackening of 0.5 to 1.8 and a derivative of zero in the region of blackening of 1 to 1.8, the said exposure having a value at which the range of the light intensity variations produced by the refraction of light through the carrier falls within the region of zero derivative of the blackening curve and the formation of striae due to the non-uniform intensity of the copying light-beam is precluded.

5. In the copying of a sound carrier having a lenticular sound track characterized by depth and width variations which refract light passed through the sound track and produce a copying light-beam of non-uniform intensity, the method of photographically producing a copy of said sound track precluding the formation of striae due to the non-uniform intensity of the copying light-beam, comprising the steps of passing light through the sound track, and exposing with the resulting light-beam of non-uniform intensity and developing, a copy film comprising a light-sensitive silver-halide emulsion layer, so that said light-sensitive emulsion layer has a blackening curve characterized by a portion of said curve having a gamma of minimum 1 below a blackening of 1 and a second portion having a gamma below 0.6 with a minimum of zero in the region of blackening of 1 to 1.8, the said exposure having a value at which the range of the light intensity variations produced by the refraction of light through the carrier falls within said second portion of the blackening curve and the formation of striae due to the non-uniform intensity of the copying light-beam is precluded.

6. In the photographic reproduction of a sound carrier having a lenticular sound track with depth and width variations whereby light passed through the sound track is refracted and rendered non-uniform in intensity, the method of producing a positive free from striae formation due to the non-uniform intensity of the copying light beam, comprising the steps of passing light through the sound track, exposing with the resulting light-beam of non-uniform intensity and developing, a negative copy silver-halide film so that said negative has a blackening curve characterized by a variable derivative at a blackening of from about 0.5 to about 1.8 and a derivative of about zero in the region of blackening of from about 1 to about 1.8, the said exposure having a value at which the range of the light intensity variations produced by the refraction of light through the carrier falls within the region of zero derivative of the blackening curve and the formation of striae due to the non-uniform intensity of the copying light-beam is substantially precluded, passing light through the negative so exposed and developed, exposing with the resulting light-beam and developing the positive, and limiting the intensity of said light to a value at which the portion of the light beam passing through the negative copy of the sound track has a maximum intensity below the threshold value of the blackening curve of the positive to thereby produce a positive copy of the sound track free from striae formation.

CORNELIS JOHANNES DIPPEL.
KLAAS JANNES KEUNING.
HONORÉ JOSEPH JULES
       VERKINDEREN.
RENE LAURENT HENRI VAN
       HOESTENBERGHE.